No. 606,944. Patented July 5, 1898.
C. SEARS.
INTERLOCKING DEVICE FOR TYPE WRITING MACHINES.
(Application filed Jan. 14, 1897.)
(No Model.)
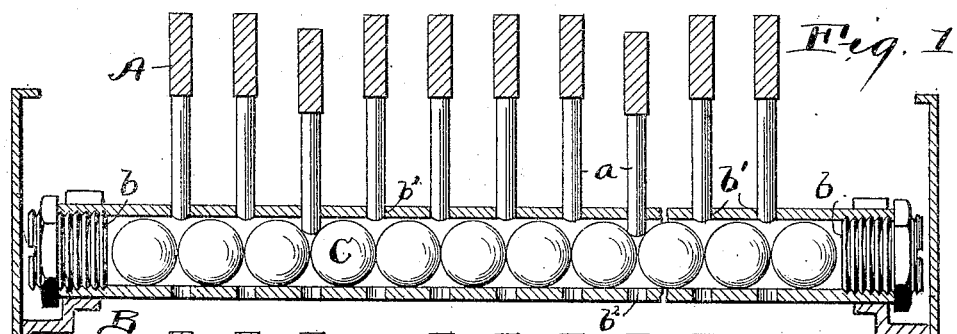
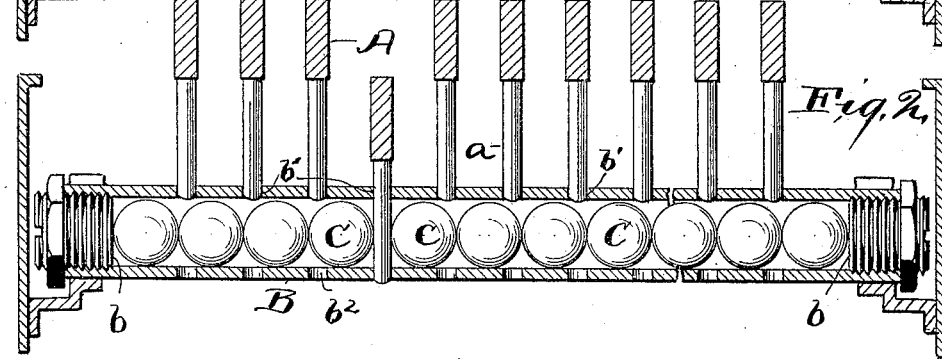
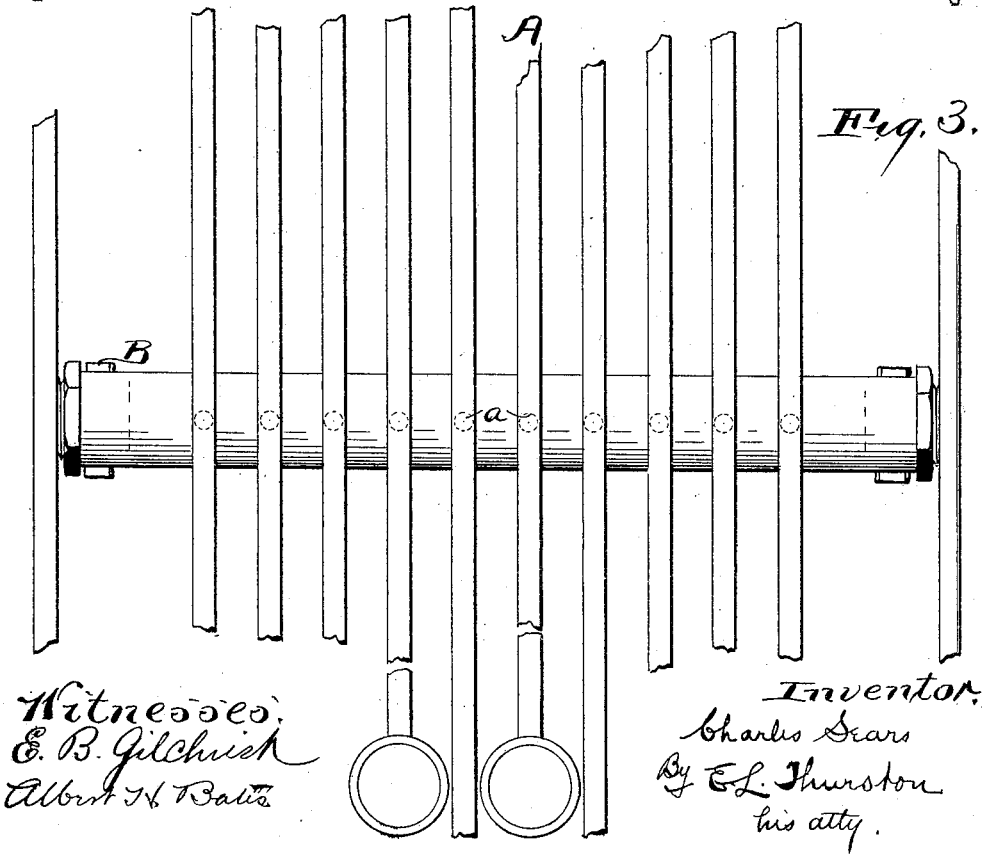
Witnesses:
E. B. Gilchrist
Albert H. Bates
Inventor,
Charles Sears
By E. L. Thurston
his atty.
THE NORRIS PETERS CO., PHOTO-LITHO., WASHINGTON, D. C.

UNITED STATES PATENT OFFICE.

CHARLES SEARS, OF CLEVELAND, OHIO.

INTERLOCKING DEVICE FOR TYPE-WRITING MACHINES.

SPECIFICATION forming part of Letters Patent No. 606,944, dated July 5, 1898.

Application filed January 14, 1897. Serial No. 619,230. (No model.)

*To all whom it may concern:*

Be it known that I, CHARLES SEARS, a citizen of the United States, residing at Cleveland, in the county of Cuyahoga and State of Ohio, have invented certain new and useful Improvements in Interlocking Devices; and I do hereby declare the following to be a full, clear, and exact description of the invention, such as will enable others skilled in the art to which it appertains to make and use the same.

The invention relates to interlocking devices adapted to prevent the concurrent operation of more than one of a plurality of independent levers.

The invention is adapted to a wide variety of uses; but it was originally designed to prevent the concurrent operation of two or more of the key-levers of a type-writer or analogous machine, wherefore the drawings have been made to show the invention when constructed and arranged particularly for such purpose.

The invention consists in the construction and combination of parts hereinafter described and claimed.

In the drawings, Figure 1 is a sectional front elevation of a plurality of type-writer levers and my new mechanism for preventing the simultaneous operation of two or more such levers. Fig. 2 is a similar view of the same parts, showing them in different relative positions. Fig. 3 is a plan view of the same parts.

Referring to the parts by letters, A A represent a plurality of independent levers, which, as before stated, are, in the particular construction shown, the key-levers of a type-writer, matrix-machine, or other analogous device. There may be any number of these levers, and they may be of any form.

B represents a tube which extends transversely across all of the levers and upon that side thereof toward which they move when they are moved from their normal position. The tube is below the levers in the construction shown, because they move downward when they are operated. A number of steel balls are placed in this tube, by which they are maintained in line. The balls are free to move in either direction within the tube; but their motion is limited by stops $b\ b$ at the ends of the tube. These stops in the construction shown are adjustable plugs which screw into the ends of the tube. There will preferably be one more ball than there are levers, and the total amount of free space between all of the balls and the stops is only slightly greater than the diameter of the levers or such devices carried by the levers as are intended to be passed between the balls when the levers are operated.

On the under side of each lever, as shown, is secured a pin $a$. These pins pass into the tube through perforations $b'$ therein when the levers are actuated and in so doing pass between two of the balls C. The balls upon opposite sides of the pin so moved into the tube are moved to right and left, respectively, toward the stops $b\ b$ and into contact with one another. The friction incident to this movement is very slight and does not sensibly impede the operation of the levers. When one pin has passed between two of the balls, as shown in Fig. 2, it is obvious that if an attempt were made to actuate another lever its pin would strike one of the balls, and since said ball is for the time being practically immovable the operation of the lever is prevented. When any lever in the embodiment of the invention shown is moved to the end of its normal path, its pin enters a hole $b^2$ in the opposite side of the tube, whereby the bending of the said pin by pressure upon another lever is practically impossible.

If an attempt is made to simultaneously operate two levers, their pins simultaneously strike balls, the balls between the pins being thereby moved into close contact; but this movement of said balls in either direction cannot be equal to half the diameter of the pins, wherefore the movement of both levers is checked. It is therefore impossible to move any lever until all of the others have returned to their normal position, and it is likewise impossible to operate two levers at the same time.

For obvious reasons I prefer to employ balls which are accurate spheres as the locking members. The construction might be operative, however, if these members were rings or perhaps ellipsoidal bodies, and I intend the term "balls" herein to be taken as including such and similar forms.

Having described my invention, I claim—

1. The combination of a plurality of levers

A, a pin *a* rigidly secured to each lever and projecting therefrom at substantially right angles to its length, a tube B suitably supported in the line of movement of the pins, there being an entrance to said tube in said line of movement, said tube inclosing a set of balls, and a screw-plug in the end of said tube for adjusting the balls, substantially as described.

2. The combination of a plurality of substantially horizontal levers A, a pin *a* projecting downward from each lever, a tube B supported beneath said levers and transversely of them, and adapted to have said pins project into it, balls in said tube and a screw-plug in the end of said tube for adjusting the balls, substantially as described.

3. The combination of a plurality of levers, and pins projecting severally from said levers, with a tube secured in the plane of the row of pins and inclosing a set of balls C and having holes $b'$ in which said pins constantly stand and by which they are guided and prevented from swerving longitudinally of the tubes, and means for limiting the sum of the play between the said balls to an amount substantially equal to the thickness of one pin, substantially as described.

4. The combination of a plurality of levers, and pins projecting severally from said levers, with a tube secured in the plane of the row of pins and having perforations through which the pins may enter the tube, a plurality of balls in said tube, and adjustable screw-plugs in the ends of said tube, substantially as and for the purpose specified.

5. The combination of a plurality of independently-movable levers A, pins *a* projecting therefrom, a tube B extending transversely of the levers in the path of movement of the pins and containing a set of balls, holes $b'$ and $b^2$ on opposite sides of said tube, said holes being adapted to embrace the pins and prevent their swerving longitudinally of the tube, and means for limiting the play between said balls, substantially as described.

6. The combination of a plurality of levers A, a pin *a* rigidly secured to each lever and projecting therefrom at substantially right angles to its length, a tube B suitably supported in the line of movement of the pins, said tube inclosing a set of balls C and having holes $b'$ in which said pins constantly stand by which they are guided, the sum of the play between said balls being substantially equal to the thickness of one pin, and screw-plugs *b* screwing into the ends of the tube B and establishing and maintaining the proper play between the balls, substantially as described.

In testimony whereof I affix my signature in presence of two witnesses.

CHARLES SEARS.

Witnesses:
E. L. THURSTON,
H. M. HUTCHISON.